United States Patent Office 3,629,135
Patented Dec. 21, 1971

3,629,135
METHOD OF DISSOLVING RADIOACTIVE CONTAMINATED ORGANIC ION EXCHANGE RESINS
Malcolm W. Wilding, Idaho Falls, Idaho, assignor to the United States of America as represented by the United States Atomic Energy Commission
No Drawing. Filed Oct. 10, 1968, Ser. No. 766,653
Int. Cl. C09k 3/00
U.S. Cl. 252—301.1                    4 Claims

ABSTRACT OF THE DISCLOSURE

A method of dissolving organic ion exchange resins without a residue by heating the resin in an aqueous solution of nitric acid and potassium permanganate.

CONTRACTUAL ORIGIN OF THE INVENTION

The invention described herein was made in the course of, or under, a contract with the United States Atomic Energy Commission.

BACKGROUND OF THE INVENTION

Ion exchange resins are of importance in nuclear chemistry as a means for separating many of the rare earths from other fission products and from each other. Because of the radioactivity of the products which are separated by the ion exchange resins, the resins themselves become contaminated with the radioactivity and eventually must be disposed of. Since the resins are radioactive, they cannot be merely dumped somewhere, but instead must be stored in specially defined areas until such time as their radioactivity has diminished to what are considered to be safe levels.

At present the radioactive resins are disposed of by several means. For example, they may be manually removed from the column or bed wherein they were used and hauled to a waste disposal area. The resins can be slurried from the column by backflushing and then sent as a slurry through pipes into storage tanks. A third method is to partially destroy the resin and transport the residue and solution through pipes into the storage tanks.

All of these methods, however, are beset with a number of problems. Removal of highly radioactive solid resin or resin residue is hazardous from the standpoint of safety, in addition to being difficult and costly because of extra shielding, packaging and man-hours required to transport and dispose of a radioactive solid waste.

Slurries should be avoided because of potential line plugging and resin entrapment in the pipes and valves. This would, of course, require disassembly or other equally hazardous means to clean the clogged pipes. In addition, if organic resins are contacted with high concentrations of nitric acid or are subjected to large quantities of radiation, rapid degradation of the resin can occur, causing release of gas. This gas release can be violent enough to be explosive and may subsequently result in pipe rupture.

One safe method of resin disposal would be to completely dissolve the resin so that it could simply safely, and economically be transported by pipe into waste storage tanks. Generally the resins are only partially dissolved, or, if total dissolution of the resin is accomplished, a solid residue of oxidation products results which must then be disposed of.

In one of these processes, resin is dissolved in a 6% $KMnO_4$ solution containing four resin volumes of 26% $NaNO_3$ solution and enough NaOH to adjust the initial pH to 9. Although dissolution of the resin is essentially complete, the $KMnO_4$ is reduced to $MnO_2$ which usually amounts to 2 to 5 times the initial volume of resin. Obviously, the substitution of the $MnO_2$ for the resin does not really solve the transportation and storage problems which are to be eliminated.

It is therefore the object of this invention to provide a process for the treating of ion exchange resins until they are completely dissolved and which does not leave any organic or inorganic residue.

SUMMARY OF THE INVENTION

I have discovered a method which results in the complete destruction and dissolution of organic ion exchange resins without leaving any residue thus eliminating many of the problems enumerated above.

The process of this invention involves employing a solution containing $KMnO_4$ and $HNO_3$ to dissolve the ion exchange resin. A mixture of the solvent solution and the resin is heated at 70 to 90° C. until the resin is completely dissolved.

DETAILED DESCRIPTION OF THE PREFERRED EMBODIMENT

A preferred solvent solution contains 0.2 M $KMnO_4$ and 2.0 M $HNO_3$, although use of 1.5 M $HNO_3$ will also result in complete dissolution and no residue at the higher temperature. A concentration of 1.0 M $HNO_3$ was found to completely dissolve the resin but may result in a trace of residue.

Preferred temperatures for dissolution range from 70 to 90° C., the higher temperature resulting in slightly faster dissolution rates of the resin and permitting lower concentrations of nitric acid.

This process will permit complete dissolution of polystyrene trimethyl benzyl ammonium which has a trade name of Dowex 1 leaving no residue. Polystyrene nuclear sulfonic acid (Dowex 50) was also found to be completely dissolved by this process. However, dissolution of this resin did result in a small amount of residue identified as $MnO_2$.

The time required for dissolution was found to range from 6 to 8 hours. Generally the higher temperatures will result in slightly shorter dissolution times.

It was found that 1 liter of solution would completely dissolve 40 grams of the resin. A lower proportion of solution to resin will either result in incomplete dissolution or will result in a residue and should be avoided.

The following example is given as an illustration of the process of this invention and is not to be taken as limiting the scope or extent of the invention.

EXAMPLE I 40 grams of polystyrene trimethyl benzyl ammonium resin were added to an austenitic stainless steel container containing 1 liter of a 2.0 M $HNO_3$ solution to which 0.2 M potassium permanganate has been added. The solution was heated to 70° C. and that temperature was maintained for 8 hours, after which it was allowed to cool. Upon inspection of the resulting solution, the resin was found to have been completely dissolved and there were no chemical residues in the container.

Following is a table showing the test conditions and results of trial dissolutions of Dowex 1-X4 Resin in which 40 grams of resin were added to 1 liter of various solutions under varying time and temperature conditions.

| Temp. (° C.) | Time (hrs.) | $CrO_3$ (M) | $KMnO_4$ (M) | $HNO_3$ (M) | Observations |
|---|---|---|---|---|---|
| 20 | 24 | 10 | | | Physically degraded but not dissolved. |
| 70 | 24 | 16 | | | Do. |
| 90 | 24 | 10 | | 4.0 | Do. |
| 20 | 24 | | 1.5 | | No apparent degradation. |
| 90 | 24 | | 1.5 | | Do. |
| 20 | 24 | | 0.2 | 2.0 | Do. |
| 90 | 6 | | 0.2 | 2.0 | Completely dissolved. |
| 90 | 8 | | 0.2 | 1.0 | Dissolved except for a trace of resin. |
| 70 | 8 | | 0.2 | 2.0 | Completely dissolved. |

It can readily be seen that the process of this invention provides a simple and easy means of dissolving ion exchange resins so that such resins may be more easily and economically transported and disposed of.

It will be understood that the invention is not to be limited to the details given herein but that it may be modified within the scope of the appended claims.

The embodiments of the invention in which an exclusive property or privilege is claimed are defined as follows:

1. A method for dissolving radioactive contaminated organic ion exchange resins comprising: preparing a nitric acid solution containing potassium permanganate, mixing said solution and said resin, and heating said solution until said resin is completely dissolved.

2. The method of claim 1 wherein the nitric acid solution contains 1.0 to 2.0 M $HNO_3$ and 0.2 M $KMnO_3$.

3. The method of claim 2 wherein the solution and resin mixture is heated to form 70 to 90° C. and said temperature is maintained from 6 to 8 hours.

4. The method of claim 3 wherein the resin is a member of a group consisting of polystyrene trimethyl benzyl ammonium and polystyrene nuclear sulfonic acid.

References Cited

UNITED STATES PATENTS

| 3,013,978 | 12/1961 | Rosinski | 252—301.1 |
| 3,252,920 | 5/1966 | Goren | 23—338 X |
| 3,340,200 | 9/1967 | Noble | 252—301.1 |

OTHER REFERENCES

Nuclear Science Abstract; vol. 20, No. 22, November 1966; NSA-41031.

BENJAMIN R. PADGETT, Primary Examiner

S. J. LECHERT, Jr., Assistant Examiner

U.S. Cl. X.R.

23—309, 312; 208—45; 210—29; 260—2.3, 704